US008605775B2

(12) United States Patent
Massey

(10) Patent No.: US 8,605,775 B2
(45) Date of Patent: *Dec. 10, 2013

(54) MEASURING HUM IN A DIGITAL TV SIGNAL

(75) Inventor: Gregory W. Massey, Greenfield, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,951

(22) Filed: May 7, 2012

(65) Prior Publication Data

US 2012/0218419 A1 Aug. 30, 2012

Related U.S. Application Data

(63) Continuation-in-part of application No. 12/413,086, filed on Mar. 27, 2009, now Pat. No. 8,189,651, and a continuation-in-part of application No. 11/856,921, filed on Sep. 18, 2007, now Pat. No. 7,792,183.

(60) Provisional application No. 61/040,161, filed on Mar. 28, 2008, provisional application No. 60/829,181, filed on Oct. 12, 2006.

(51) Int. Cl.
*H04B 3/46* (2006.01)
*H04B 17/00* (2006.01)
*H04Q 1/20* (2006.01)

(52) U.S. Cl.
USPC ............................ 375/224; 702/58; 324/76.11

(58) Field of Classification Search
USPC ......... 375/316, 320, 332, 224, 228, 261, 268; 702/143, 69; 324/76.11
See application file for complete search history.

(56) References Cited

U.S. PATENT DOCUMENTS

| 4,905,086 | A | * | 2/1990 | Tahara | 348/723 |
|---|---|---|---|---|---|
| 5,260,792 | A | | 11/1993 | Toyoda et al. | 348/607 |
| 5,394,185 | A | | 2/1995 | Bernard | 348/192 |
| 5,673,293 | A | | 9/1997 | Scarpa et al. | 375/321 |
| 6,160,443 | A | * | 12/2000 | Maalej et al. | 329/304 |
| 6,249,180 | B1 | | 6/2001 | Maalej et al. | 329/304 |
| 6,754,260 | B1 | | 6/2004 | Itahara et al. | 375/224 |
| 7,086,083 | B2 | | 8/2006 | Zhang et al. | 725/143 |
| 7,142,609 | B2 | | 11/2006 | Terreault et al. | 375/261 |
| 7,162,731 | B2 | * | 1/2007 | Reidhead et al. | 725/107 |
| 7,529,303 | B1 | * | 5/2009 | Schwartzman et al. | 375/257 |
| 2003/0149991 | A1 | * | 8/2003 | Reidhead et al. | 725/119 |
| 2006/0023125 | A1 | * | 2/2006 | Zeidler | 348/731 |
| 2008/0048882 | A1 | | 2/2008 | Paugh et al. | 340/870.02 |
| 2008/0089402 | A1 | | 4/2008 | Massey et al. | 375/227 |
| 2009/0295995 | A1 | * | 12/2009 | Aggarwal et al. | 348/553 |

* cited by examiner

*Primary Examiner* — Jean B Corrielus
(74) *Attorney, Agent, or Firm* — Matthew A. Pequignot; Pequignot + Myers LLC

(57) ABSTRACT

The invention relates to a method for measuring Hum on a digital QAM carrier using a testing device for testing digital TV signals including a QAM demodulator therein, and to a testing device implementing the method. A controller is used to sample a register associated with a final AGC stage in a QAM demodulator, and to process the collected register values to obtain one or more Hum characteristics. In one embodiment, a circular buffer is used to collect aligned sequences of AGC samples that have a pre-determined feature of time-domain Hum at a specified position therein. The aligned AGC sequences are then correlated to assess causes of Hum.

19 Claims, 13 Drawing Sheets

MEASURING HUM IN A DIGITAL TV SIGNAL

CROSS-REFERENCE TO RELATED APPLICATIONS

The present invention is a continuation in part of U.S. patent application Ser. No. 12/413,086, filed Mar. 27, 2009, entitled "Measuring HUM in a Digital TV Signal", now issued U.S. Pat. No. 8,189,651, which claims priority from U.S. Provisional Patent Application No. 61/040,161 filed Mar. 28, 2008, entitled "Measuring Hum on Digital Carriers" and is a continuation in part of U.S. patent application Ser. No. 11/856,921 filed Sep. 18, 2007, entitled "Digital Quality Index For QAM Digital Signals", now issued U.S. Pat. No. 7,792,183, which claims priority from U.S. Provisional Patent Application No. 60/829,181 filed Oct. 12, 2006, all of which are incorporated herein by reference.

TECHNICAL FIELD

The present invention relates to measurements of Hum in a digital TV signal, and in particular relates to methods of measuring Hum in quadrature amplitude modulated (QAM) digital channels in a CATV cable system using a QAM signal tester.

BACKGROUND OF THE INVENTION

Digitally modulated signals are used to transport high-speed data, video and voice on cable networks. The high-speed signals may be subject to a variety of impairments that can seriously impact the quality and reliability of the services being provided. One such potential impairment is known as Hum, and is caused by an ingress of the AC power line signal onto a coax cable plant. In the US, Hum appears as variations of the power of a TV signal at 60 Hz and/or its second harmonic 120 Hz, while in Europe corresponding frequencies are 50 Hz and 100 Hz.

The degree to which Hum is present in a TV signal is a key indicator of the "health" of a cable TV network, and is a required measurement per FCC regulation. Traditionally, the presence of Hum has been assessed by measuring a level fluctuation of sync tips of an analog TV signal, serving as reference points in time. However, in recent years the Community Antenna TeleVision (CATV) network has evolved from an unidirectional analog system to a bi-directional, Hybrid Fiber Coaxial with a mix of analog and digital signals, and it is expected that the digital portion of the CATV network will continue to increase. As the CATV industry is evolving towards total digital, in the future there may not be any analog TV signals left in the channel line-up to enable Hum measurement. Since there is no amplitude references in the digital TV signal, there is a need to find a different way to measure Hum that would be suitable for assessing the quality of digital TV signals.

Delivery of data services over cable television systems is typically compliant with a data-over-cable-service-interface-specifications (DOCSIS) standard. Digital TV (DTV) signals propagating in the coax cable plant of the CATV network typically include signals that are modulated using quadrature amplitude modulation (QAM), and can be referred to as QAM digital signals or QAM digital channel signals. In the United States, 64-QAM and 256-QAM are the mandated modulation schemes for digital cable as standardized by the SCTE in the standard ANSI/SCTE 07 2000.

There currently exists or have been disclosed a variety of test instruments for measuring different parameters representing the quality of a digital QAM TV signal in the CATV coax cable plant. To troubleshoot a subscriber's premises with a signal problem, a technician will travel to the premises or a hub nearby, and conduct a variety of tests on the digitally modulated signal, e.g. RF level, MER, pre- and post-FEC BER, and an evaluation of the constellation for impairments. In addition, the technician may look at the equalizer graph for evidence of micro-reflections, and check in-channel frequency response and group delay. Moreover, if the QAM analyzer is able, the measurements are repeated in the upstream direction. Hand-held battery-powered testing devices for testing DTV signals are a particularly convenient tool for performing TV signal measurements in the field. Unfortunately, such devices currently do not have the capability of measuring Hum on DTV signals.

U.S. Pat. No. 7,142,609, which is incorporated herein by reference, discloses a test instrument, which teaches a method and an apparatus for detecting and quantifying impairments in digital QAM signals. This patent teaches measuring Hum by de-modulating the digital QAM signal, and by using a spectrum analyzer functionality to sample the I and Q quadrature components of the de-modulated QAM signal and to trigger the sampling sequences to the power line to extract Hum-related modulation of the TV signal.

One drawback of this approach is that it requires the use of a power line for triggering, which is not available in a battery operated device.

Another drawback of this approach is that Hum components that are not synchronized with the 60 Hz line rate, for example disturbances in a TV signal that are related to faults in switching-type power supply circuits that are often used in trunk amplifiers and line extenders in a CATV network, may not be properly evaluated. Furthermore, using a power line for triggering in measuring Hum may fail if Hum is related to a battery back-up power supply which is not synchronized with the main power supply.

Accordingly, there is a need to have a simple and efficient method for measuring Hum on a digital QAM carrier with a battery-operated tester device for testing QAM digital signals.

SUMMARY OF THE INVENTION

An object of the present invention is to provide a simple and efficient method for measuring Hum on one or more QAM channels in a cable network that can be used in a battery-powered testing device, and to provide a testing device implementing such method.

In accordance with the invention, there is provided a method for measuring Hum in a digital TV (DTV) signal using a testing device for testing QAM signals on a cable TV network, the method comprising: a) receiving the DTV signal with the testing device, the testing device comprising a DTV receiver and a controller coupled thereto, the DTV receiver comprising one or more tuners operationally followed by a first QAM demodulator for demodulating a first QAM signal comprised in the DTV signal, wherein the DTV receiver further includes a plurality of automatic gain control (AGC) stages, each comprising an AGC register for storing a current AGC gain value of the respective AGC stage, b) sampling values stored in one of the AGC registers at a pre-defined sampling rate R that exceeds two times a Hum frequency to obtain a first sequence of AGC samples; and, c) using the controller to store and analyze the first sequence of AGC samples, or at least a portion thereof, for evaluating the presence of Hum in the first QAM signal. In one aspect of the invention, the one of the AGC registers is comprised in a final AGC stage of the DTV receiver.

A further aspect of the present invention provides a testing device for testing a DTV signal on a cable television (CATV) network, which comprises an input port for receiving the DTV signal, and a DTV receiver coupled to the input port. The DTV receiver comprises a first QAM demodulator for demodulating a first QAM signal comprised in the DTV signal, and further comprising a plurality of automatic gain control (AGC) stages in a signal path of the first QAM signal, wherein the plurality of AGC stages comprises a final AGC stage within the first QAM demodulator, and one or more preceding AGC stages, the final AGC stage comprising an AGC register for storing a current AGC gain value thereof. The testing device further comprises a controller coupled to the DTV receiver for tuning the DTV receiver to the first QAM channel and for sampling the content of the AGC register of the final AGC stage, and an output device coupled to the controller. The controller is programmed to perform operations comprising: a) sampling values stored in the AGC register of the final AGC stage at a pre-defined sampling rate R that exceeds two times a Hum frequency to obtain a first sequence of AGC samples; and, b) analyzing the first sequence of AGC samples to obtain one or more Hum characteristics. In one aspect of the present invention, the one or more Hum characteristics are provided to the output device for storing therein or for reporting to a user.

In one aspect of the invention, the final AGC stage comprises a decision-directed AGC (DD-AGC) circuit of the first QAM demodulator, and the one of the AGC registers is a DD-AGC register of the first QAM demodulator.

In one aspect of the invention, the controller may obtain a second sequence of AGC samples related to a second QAM signal from the DTV receiver, and compute a correlation between the first and second sequences of AGC samples to estimate a degree of Hum correlation therebetween. In one aspect of the invention, each of the first and second sequences of AGC samples is selected so as to be aligned to a same periodic feature of Hum in the first QAM signal.

BRIEF DESCRIPTION OF THE DRAWINGS

The invention will be described in greater detail with reference to the accompanying drawings which represent preferred embodiments thereof, in which like elements are indicated with like reference labels, and wherein.

DETAILED DESCRIPTION

Figure 1:
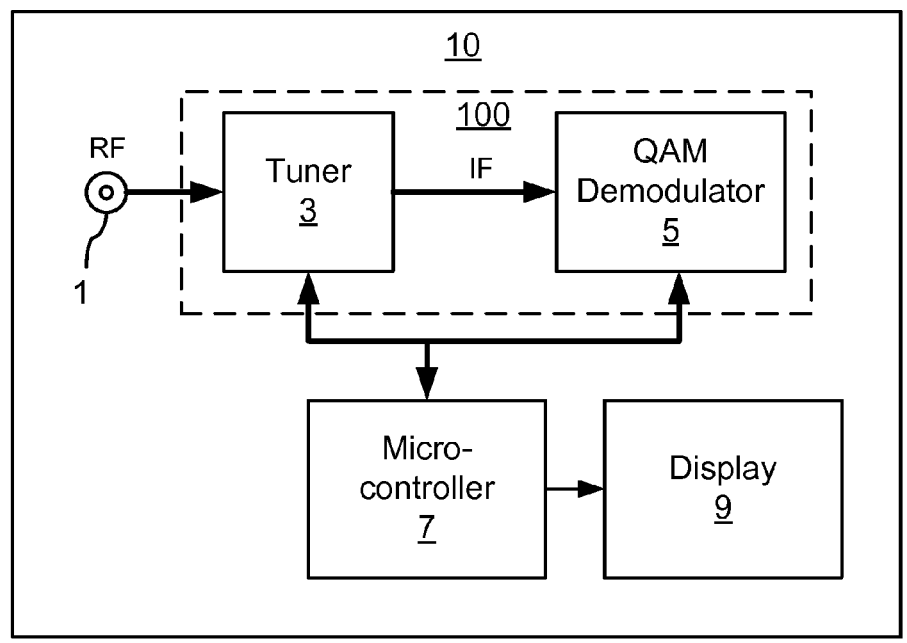
FIG. 1 is a schematic block diagram of a prior art tester device for testing a digital TV signal.

With reference to FIG. 1, a tester device (TD) 10 for testing the quality of a digital TV (DTV) signal in a cable network typically includes an input port 1 for receiving the QAM DTV signal from a cable in the cable network, and a DTV receiver 100 that is coupled to the input port 1. The DTV receiver 100 includes a tuner 3 for selecting a digital QAM channel signal from the QAM DTV signal and a QAM demodulator 5 that is coupled to the tuner 3 to receive the digital QAM channel signal therefrom. A micro-controller 7 is provided that is coupled to the tuner 3 and the QAM demodulator 5 for controlling operation thereof. A display unit 9 is coupled to the micro-controller 7 for displaying test result after and/or during the measurement. The TD 10 may also include a keypad (not shown), and possibly an Ethernet or other external connection for connection to a personal computer or a network. The QAM demodulator 5 may perform several functions on the received signal, such as carrier frequency acquisition, carrier phase tracking, symbol rate tracking, adaptive equalization, and J.83 channel decoding, and output performance parameters related thereto. By probing into the elements of the QAM demodulator 5 upon request from a user or following a pre-programmed test schedule, the micro-controller 7 can retrieve information on the modulation error ratio (MER), pre- and post-FEC (forward error correction) BER (bit error rate), and channel response, which is part of physical layer testing. One example of the TD 10 is a DSAM-6000 Network Maintenance Sweep Meter, available from JDSU Inc. Another example of the TD 10 is a DQI testing device for measuring a digital quality index (DQI™) that is disclosed in U.S. Pat. No. 7,792,183 filed Sep. 18, 2007, which is incorporated herein by reference.

Figure 2:
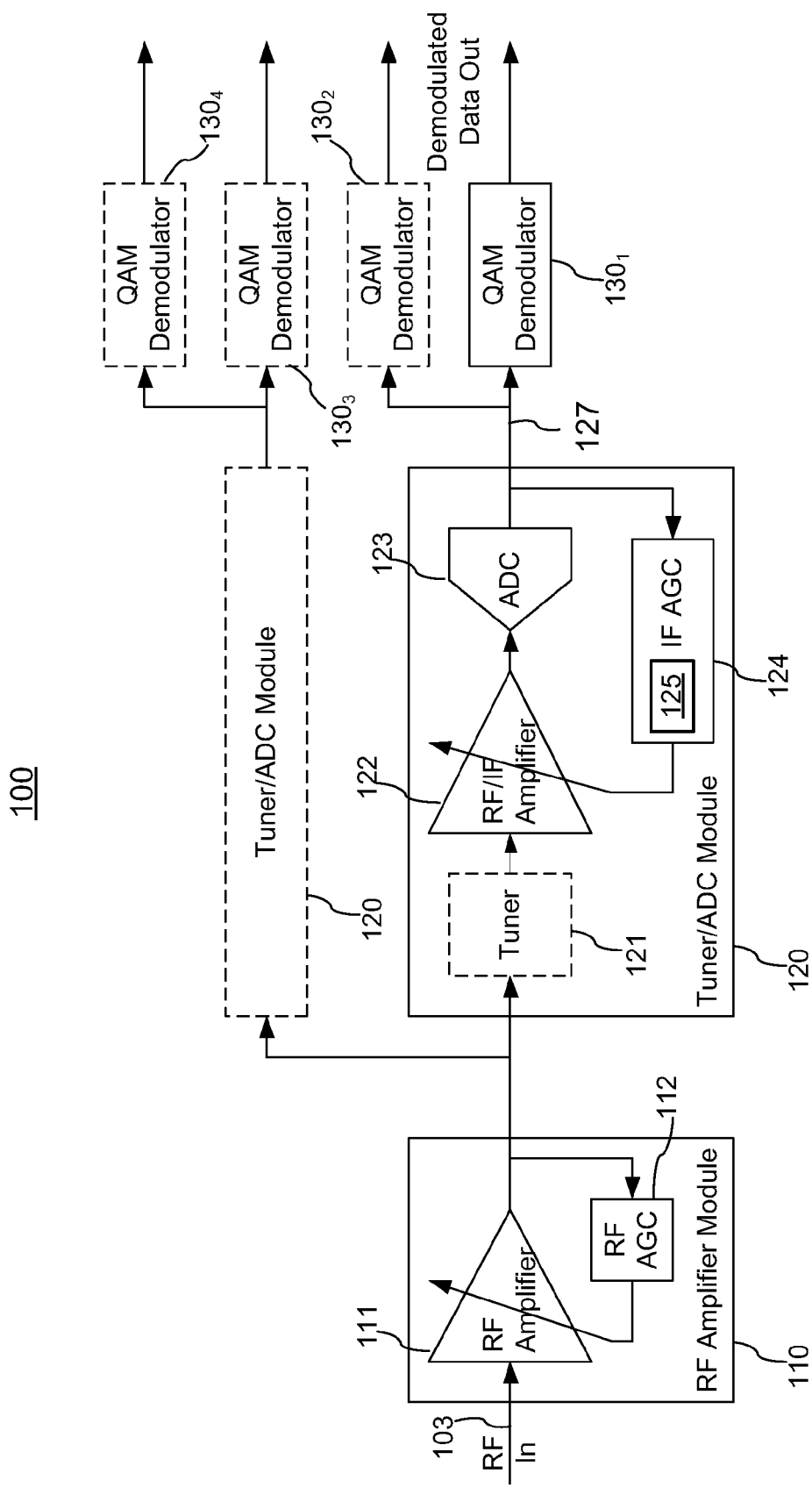
FIG. 2 is a schematic block diagram of a prior-art DTV receiver including one or more QAM demodulators and a plurality of AGC stages.

With reference to FIG. 2, there is illustrated a schematic diagram of a DTV receiver 100 that may be used in embodiments of the present invention. The DTV receiver 100 includes a multi-stage automatic gain control (AGC) circuitry including consecutive and/or nested AGC stages, and may or may not include a tuner. In the shown embodiment, the DTV receiver 100 has at its input an RF amplifier module 110 containing a variable-gain amplifier 111 controlled by an AGC feedback circuit 112, which forms a first AGC stage of the DTV receiver 100 and which function is to control the gain of the RF amplifier 111 so as to maintain an output signal therefrom at an approximately constant power level. The DTV receiver 100 may use one or more tuner/ADC modules 120 to digitize all or a portion of the RF (radio frequency) spectrum of the input DTV signal 103. Each of these modules may optionally include a tuner 121 to select a desired frequency band, another variable-gain amplifier 122 that is controlled by a second AGC circuit 124, and an analog-to-digital converter (ADC) 123 to digitize the DTV signal or the selected spectral portion thereof as selected by the tuner 121. The tuner 121, when present, may down-convert the selected spectral portion of the input RF signal 103 to an intermediate frequency (IF). Accordingly, the second AGC circuit 124 may also be referred to herein as the IF-AGC circuit, and may include an IF-AGC gain register 125 for storing IF-AGC values for controlling the gain of the RF/IF amplifier 122. A digitized signal 127 from the output of ADC 123, which is sampled at a suitable sampling rate greater than the QAM symbol rate and which may contain one or more QAM channels of the DTV signal, feeds one or more QAM demodulators 130, such as QAM demodulators $130_1$, $130_2$, $130_3$, and $130_4$ shown in FIG. 2 by way of example. Embodiments of the DTV receiver 100 may include fewer QAM demodulators 130, for example only the QAM demodulator $130_1$ which is referred to herein also as the first QAM demodulator, or more QAM demodulators 130 than illustrated in FIG. 2. The DTV receiver 100 of FIG. 2 may be embodied using a single application specific integrated circuit (ASIC), or using several ASICs as known in the art.

Figure 3:
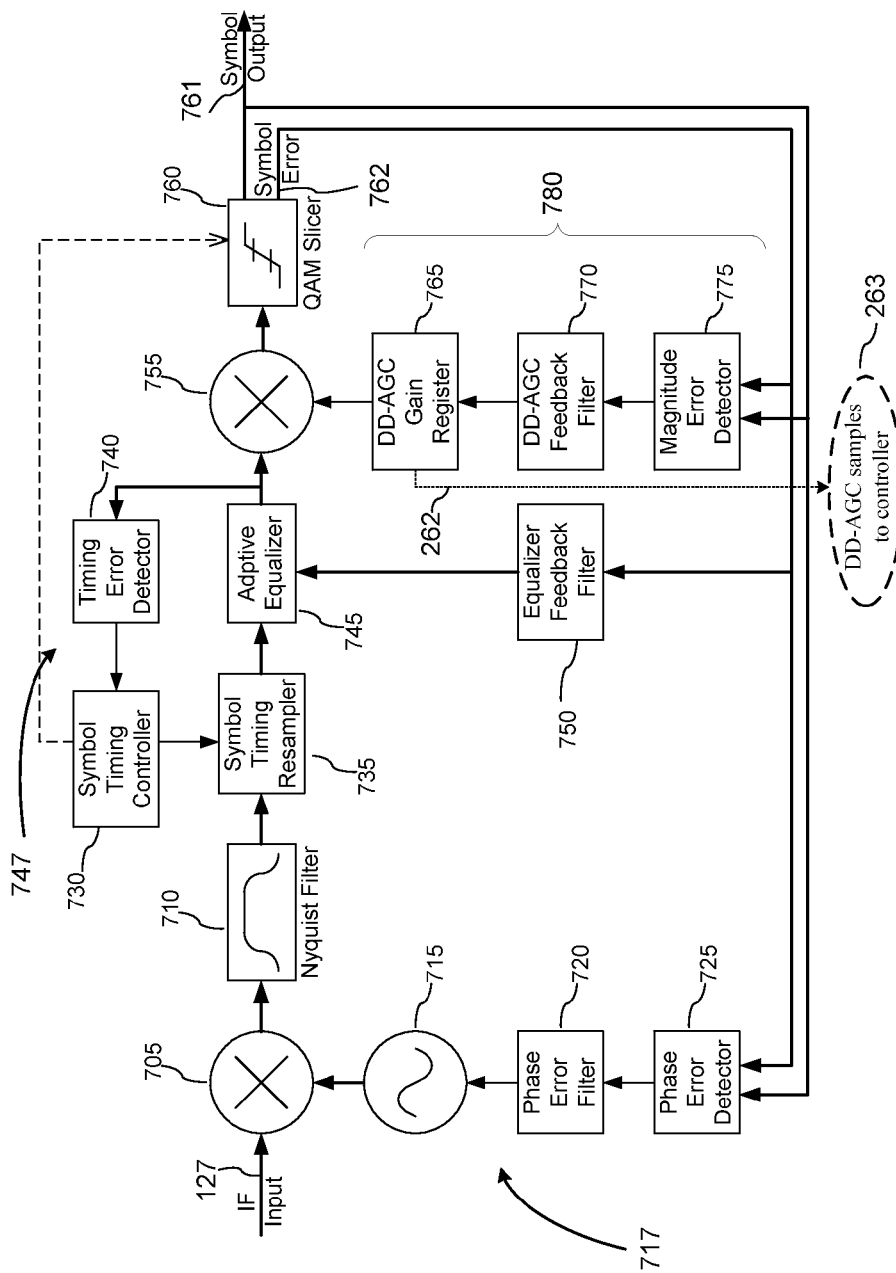
FIG. 3 is a schematic block diagram of one QAM demodulator of the DTV receiver of FIG. 2 showing a communication link to an external controller for sampling a final DD-AGC stage thereof.

With reference to FIG. 3, there is illustrated a block diagram of the QAM demodulator 130 in one embodiment thereof. The incoming digital signal 127 from the tuner/ADC block 120 is fed to a frequency mixer 705, which combines it with the output of a numerically controlled oscillator (NCO) 715 in order to convert the digitized signal 127 into I and Q baseband signals. A Nyquist filter 710, which may be for example in the form of a root cosine filter, passes the baseband frequency components of the I and Q signals up to the QAM symbol rate, blocking frequency components thereof above the QAM symbol rate. A symbol timing resampler 735 interpolates the incoming sampled I and Q signals to output I and Q samples at times corresponding to QAM symbol times, or in some embodiments, at rates 2 or 4 times the QAM symbol rate, with one resample out of every 2 or 4 occurring at a symbol time. A symbol timing controller 730 determines when these samples are to occur. If sampling is done at multiples of the QAM symbol rate, a QAM slicer 760 obtains a symbol time sync signal from the symbol timing controller 730 to enable it to output symbols at only the symbol-time samples and not the in-between samples. The re-sampled I and Q signals are passed to an adaptive equalizer (AEQ) 745 which combines multiple scaled copies of the I and Q signals with differing time delays in order to cancel out, or at least reduce, linear distortions in the signal path. The AEQ 745 connects, via a scaling multiplier 755 as described hereinbelow, to the QAM slicer 760, which may have forward error correction (FEC) and error detection capabilities. The QAM slicer 760 provides the QAM demodulator output 761 in the form of a sequence of QAM symbols, and also provides, as an additional output, QAM symbol errors 762.

The QAM demodulator 130 includes several feedback loops. A phase recovery circuit 717 is used to adjust the oscillation phase of the NCO 715 based on a feedback from the QAM slicer 760, which enables the frequency mixer 705 to compensate for phase error in the demodulated QAM symbols. A phase error detector 725 computes the phase error in each QAM symbol received from the slicer 760. These errors are filtered by a phase error filter 720, which outputs the phase correction values for the NCO 715. A timing synchronization loop 747 includes a symbol timing controller 730 that receives timing error information from a timing error detector 740, which receives its input from the output of the AEQ 745.

An equalizer loop adjusts taps of the AEQ 745 based on filtered error values provided by an equalizer feedback filter 750.

The QAM demodulator 130 further utilizes a decision-directed automatic gain control (DD-AGC) stage including a DD-AGC circuit 780 that connects between the output of the QAM slicer 760 and a multiplying port of the scaling multiplier 755 in order to control the input power into the QAM slicer 760 at a constant level. The DD-AGC 780 includes a magnitude error detector 775 followed by a DD-AGC feedback filter 770, which in turn is followed by a DD-AGC gain register 765, which is also referred to herein as the DD-AGC register 765. The equalized I and Q signals at the output of the AEQ 745 are scaled by the scaling multiplier 755, which may also be referred to as the DD-AGC mixer 755. The DD-AGC mixer 755 multiplies the equalized I and Q samples by a DD-AGC gain value stored in a DD-AGC gain register 765. The DD-AGC gain register 765 obtains the DD-AGC gain values from the magnitude error detector 775 output, filtered by the DD-AGC feedback filter 770. In operation the DD-AGC value stored in the DD-AGC register is updated at a rate that can be in the order of 5 to 7 MHz.

Various blocks and functionalities of the QAM demodulator 130 described hereinabove with reference to FIG. 3 are known in the art and could be found in commercial QAM demodulators for CATV signals.

Figure 4:
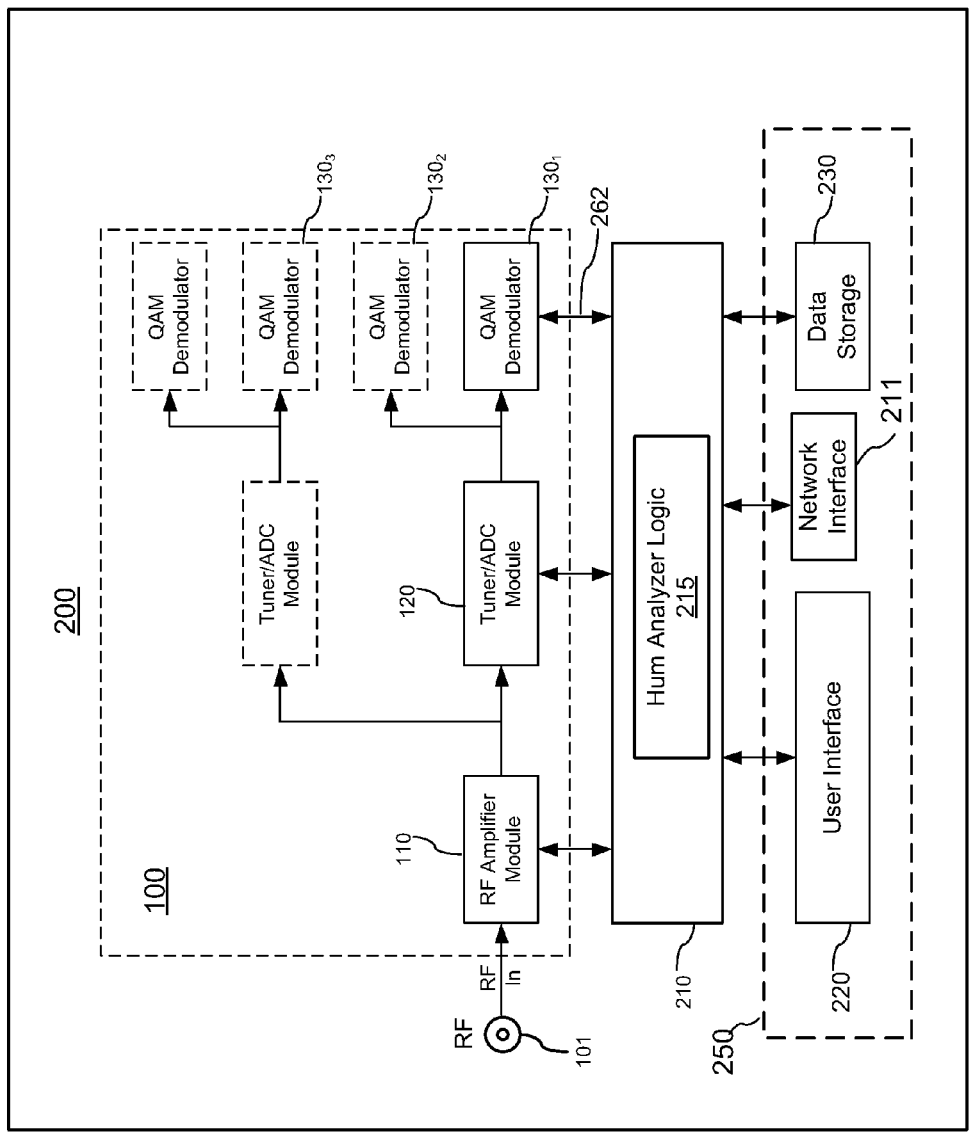
FIG. 4 is a schematic block diagram of a CATV testing device according to the present invention.

Turning now to FIG. 4, there is illustrated a testing device 200 for testing QAM signals on a cable television (CATV) network according to an embodiment of the present invention. The testing device, or tester, 200 incorporates the DTV receiver 100 that connects to an RF port 101 for receiving an input RF DTV signal, and further includes a controller 210 embodying a Hum analyzer logic (HAL) 215. The controller 210, which may be embodied using a suitably programmed micro-controller, a specialized or general purpose digital processor, an FPGA, or the like, connects to various blocks of the DTV receiver 100 and to an output device or devices 250. In one embodiment, the tester 200 includes a communication link 262 that connects the controller 210 to AGC registers of at least two QAM demodulators 130 of the DTV receiver 100 for reading AGC values therefrom, as described hereinbelow. In operation, the controller 210 sends control messages to and receives status messages from the RF amplifier modules 110, the tuner/ADC module or modules 120, and the QAM modulator or modulators 130. Examples of the control messages include, but are not limited to, commands to the tuner/ADC module 120 to tune to a particular QAM channel frequency F, set the QAM symbol rate, configure the QAM slicer 760 for 256 QAM, and begin adaptive equalization. Examples of the status messages include, but are not limited to, messages containing the mean-square error from the QAM slicer 760, the current gain value of the RF amplifier 111 or the IF amplifier 122. In one embodiment, the controller 210 connects to one or more of the AGC stages of the DTV receiver 100 for reading AGC gain values thereof. In particular, the controller 210 includes logic for periodically sampling, at a selected AGC sampling rate R, an AGC gain register of a final AGC stage of the DTV receiver 100, and for capturing portions of the resulting sampled AGC signal 263 (FIG. 3) in the form of sequences of AGC gain values in order to analyze Hum. Based on the sampled AGC signal 263, the controller 120 may obtain one or more Hum characteristics, for example as described in a parent US Patent Application 2009/0185037, now issued U.S. Pat. No. 8,189,651, which is incorporated by reference herein, and further as described hereinbelow. By way of example, the AGC sampling rate R may be in the range from about 100 ksps to about 500 ksps, or it can be as high as 1 Msps or beyond, up to an update rate of the AGC gain register of the AGC stage being sampled; here and below in this specification the abbreviation 'sps' stands for "samples per second", with "ksps" and Msps" meaning kilo ($10^3$) samples per second and mega ($10^6$) samples per second, respectively. As illustrated, the output device 250 includes: non-volatile memory, or data storage device 230, such as an optical drive, a flash memory, a solid state drive, and the like, for storing Hum-related data; a user interface 220 coupled to the controller 210 that may include a display, a keyboard, or another suitable device for data and/or command entry, using which the user may interact with HAL 215, input test parameters, request analysis results, etc; and, a network interface 211 to communicate with other network-connected devices. In other embodiments, only one or two of these output devices 220, 230, 211 may be present in the tester device 200. For example, the user may connect to the tester 200 remotely via the network interface 211.

One aspect of the present invention provides a method for measuring Hum in a DTV signal carrying one or more QAM channels using a testing device such as the QAM tester 200. In one embodiment the process of measuring Hum in a first QAM channel of the input DTV signal includes the following general steps: a) receiving the DTV signal with the DTV receiver 100 of the tester 200, and using a first QAM demodulator thereof, such as the QAM demodulator $130_1$ to demodulate the first QAM channel; b) with the controller 210, sampling values stored in an AGC register of the DTV receiver 100 in the path of the first QAM channel at a sampling rate R that exceeds two times a Hum frequency to be analyzed to obtain a first sequence of AGC samples; and, c) using the controller 210 to store and analyze the first sequence of AGC samples, or at least a portion thereof, for evaluating the presence of Hum in the first QAM signal. One embodiment of the method of the present invention for measuring Hum further includes obtaining a second sequence of AGC samples related to a second QAM signal from the DTV receiver, and computing a correlation between the first and second sequences of AGC samples to estimate a degree of Hum correlation therebetween. In one embodiment the second sequence of AGC samples related to the second QAM signal is obtained concurrently with the first sequence by sampling an AGC register of a second QAM demodulator, such as the QAM demodulator $130_2$ or $130_3$, which is disposed in the signal path of the second QAM signal in the DTV receiver 100. In one embodiment, the first and second AGC sequences may be obtained at different times at a same or different locations in the network, and may relate to a same or different QAM channels. In one embodiment, the controller 210 includes logic for triggering the capture of the first and second sequences of AGC samples at a selected feature in a corresponding time-domain Hum signal, such as a peak in a time dependence of the AGC samples magnitude, in order to ensure a proper alignment of AGC sequences taken at different times and/or locations in the network for computing the correlation.

As described hereinabove, the DTV receiver 100 includes a plurality of AGC stages, such as those based on the AGC circuits 112, 124, and 780. Embodiments of the DTV receiver 100, which include multiple tuner/ADC blocks 120 and/or multiple QAM demodulators 130 for detecting simultaneously more than one QAM channel as illustrated in FIG. 2, also include multiple AGC circuits 124 and 780.

In one embodiment of the invention, the controller 210 measures Hum in the first QAM channel by sampling the AGC register of the last, or final, AGC stage of the DTV receiver 100 in the path of the first QAM channel. If Hum in multiple QAM channels is being measured, the controller 210 is used to sample the AGC registers in the last AGC stage in the path of each QAM channel that is being measured.

In embodiments wherein the final AGC stage of the DTV receiver 100 is the DD-AGC circuit 780, the controller 210 samples the content of the DD-AGC register 765 of a QAM demodulator 130 to measure Hum in the QAM channel being demodulated by the respective QAM demodulator 130. One advantage of using the DD-AGC circuit 780 for the purpose of Hum monitoring is a high update frequency thereof, which enables the QAM demodulator 130 to respond to fast changes in the amplitude of the QAM channel signal 127. The update frequency of the DD-AGC register 765 may be equal to the symbol rate of the QAM signal, which may be in the range of 5 MHz to 7 MHz for CATV signals, or may be a fraction thereof, such as ¼ or ½ of the symbol rate. Accordingly, monitoring the content of the DD-AGC gain register 765 in accordance with the present invention enables measuring Hum at frequencies up to about 1 MHz, with higher sampling frequencies possible in some embodiments of the QAM demodulator depending on the update rate of the DD-AGC register and on the data processing rate of the controller 210. Advantageously, this enables detecting and measuring high-frequency Hum in QAM CATV channels, such as that caused by defective switching power supplies used in modern CATV equipment. Currently-existing CATV hum testers cannot measure beyond about 7.5 kHz.

Figure 5:
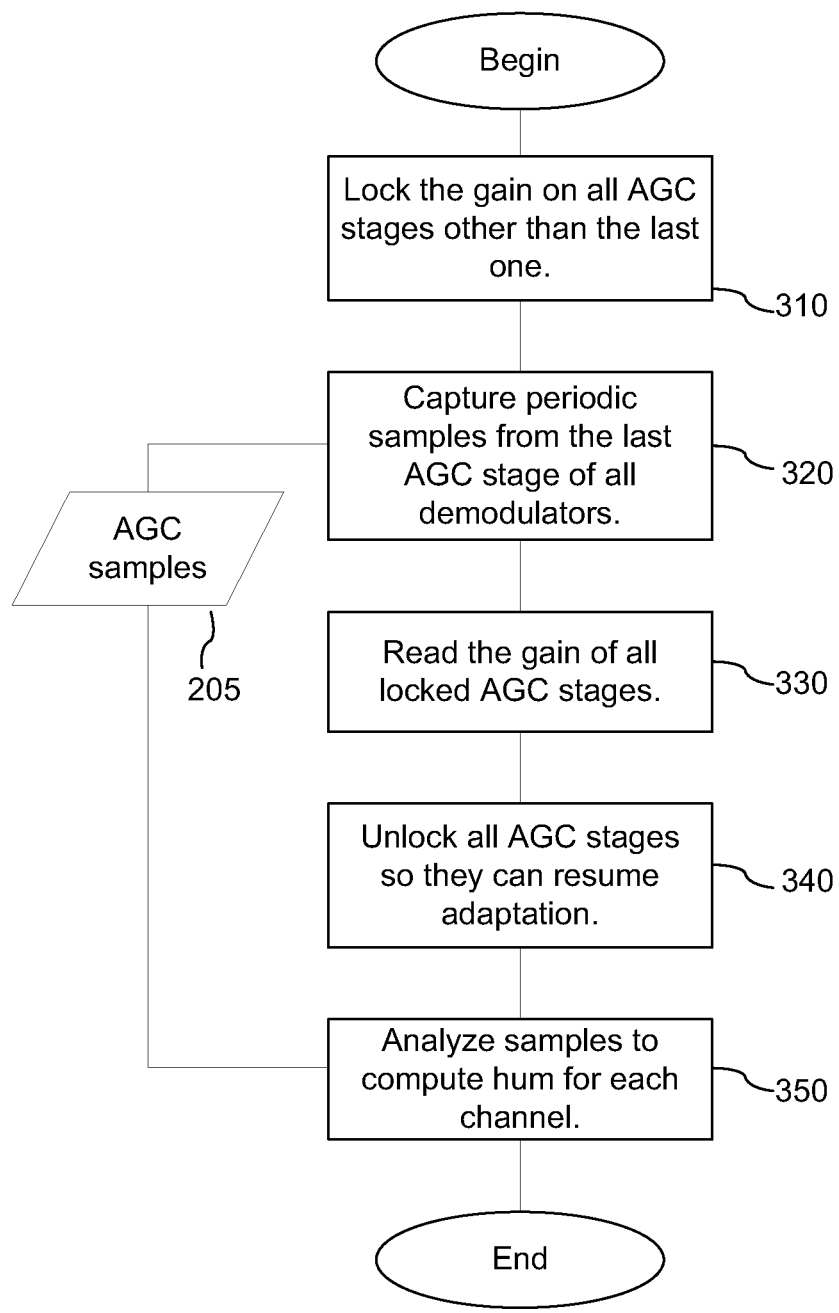
FIG. 5 is a flowchart illustrating AGC data collections steps for measuring Hum according to one embodiment of the present invention.

With reference to FIG. 5, there is schematically illustrated a sequence of steps that the tester 200 may use to measure Hum in one or more QAM channels in accordance with an embodiment of the invention.

At step 310, the gain of each AGC stage in the path of the QAM channel or channels to be measured, except the final DD-AGC stage 780 of the QAM demodulator 130, is locked by the controller 210 at its current value. By way of example, that may be accomplished by the controller 210 writing a control word into the appropriate AGC configuration registers of an ASIC embodying the DTV receiver 100. By locking the gain of all AGC stages in the path of each QAM channel being measured but the last one, changes in QAM signal amplitudes can be read by sampling only the last AGC stage's gain register. Referring to the embodiment of FIGS. 2 and 3, the controller 210 may lock the AGC gain of the AGC stages 112 and 124 while sampling the DD-AGC register 765. If the measurement is being performed on multiple QAM demodulators 130, this step may involve locking the gain of non-final AGC stages for all tuner/ADC modules 120 and/or all QAM demodulators 130 in the path of the QAM channels wherein Hum is being measured.

At step 320, the controller 210 captures periodic samples of the DD-AGC gain register 765, or the gain register of other final AGC stage, by repeatedly reading its content at the AGC sampling rate R using a communication link indicated by a dashed arrow 262 in FIG. 3, thereby providing to the controller an AGC signal 263 in the form of a stream of AGC samples. If multiple QAM channels are being monitored, AGC gain samples from each QAM demodulator 130 may be captured at each time interval. The AGC sample rate R, which determines the maximum measurable Hum frequency $f_{Hmax} < R/2$, is chosen based on the response time of the ASIC's final AGC stage and the rate at which the controller 210 can capture samples and store them in system memory. By way of example, the sampling rate R may be selected in the frequency range from several ksps (kilo samples per second) to up to several Msps. In one embodiment, the periodic AGC samples are accumulated in a buffer until a sequence of AGC samples 205 of a desired length N is captured.

The number N of AGC samples in the sequence of AGC samples 205, which will also be referred to herein as the Hum analysis sequence, the data sample, or the AGC capture, is selected so as to enable a reliable estimation of a desired Hum characteristic or characteristics, and may depend on a particular Hum characteristic or characteristics of interest. In one embodiment, the number of AGC samples to capture is chosen so that the data 205 spans at least one complete cycle and preferably two or more cycles of a particular Hum component, such as that related to the periodicity of an AC power source of relevant CATV equipment, or to a higher-frequency Hum component of interest. In other embodiments, a shorter Hum analysis sequence 205 may be sufficient. The number of samples may be chosen to be a power of 2 to facilitate FFT (fast Fourier transform) calculations to compute Hum spectrum as descried hereinbelow. By way of example, the controller 210 may be programmed to capture AGC samples from each QAM demodulator 130 every 2.5 microseconds until 16384 AGC samples have been captured. Each of the resulting multiple sample data sets 205 will span 41 milliseconds. With such a sample the controller 210 can measure hum frequencies as low as 24 Hz (=¼ 1ms) and as high as 200 kHz (=1/(2*2.5 µs)).

At step 330, the controller 210 reads the gains of all locked AGC stages in the path of each QAM channel wherein Hum is being measured. After a desired number of samples is captured, in step 340 the controller 210 unlocks the gain of the AGC stages locked at step 310. At step 350, the controller 210 performs a Hum-related analysis of the captured sequence of AGC samples 205, or of multiple such sequences each captured from the AGC gain register of the last AGC stage of a respective QAM demodulator 130, when AGC registers of multiple QAM demodulators 130 are sampled. In one embodiment the controller 210 unlocks the gain of the AGC stages that were locked in step 310 before performing the Hum-related analysis of the captured samples so that the analyzer can continue tracking gradual changes in amplitude and stay locked to each QAM signal in preparation for another measurement. The Hum-related analysis may include computing a Hum frequency spectrum, a Hum peak to valley ratio (HPVR) parameter, a correlation between two Hum measurements, and/or other Hum characteristics as desired for a particular application. In one embodiment, results of the Hum-related analysis are displayed to the user with the user interface 220.

Figure 6:
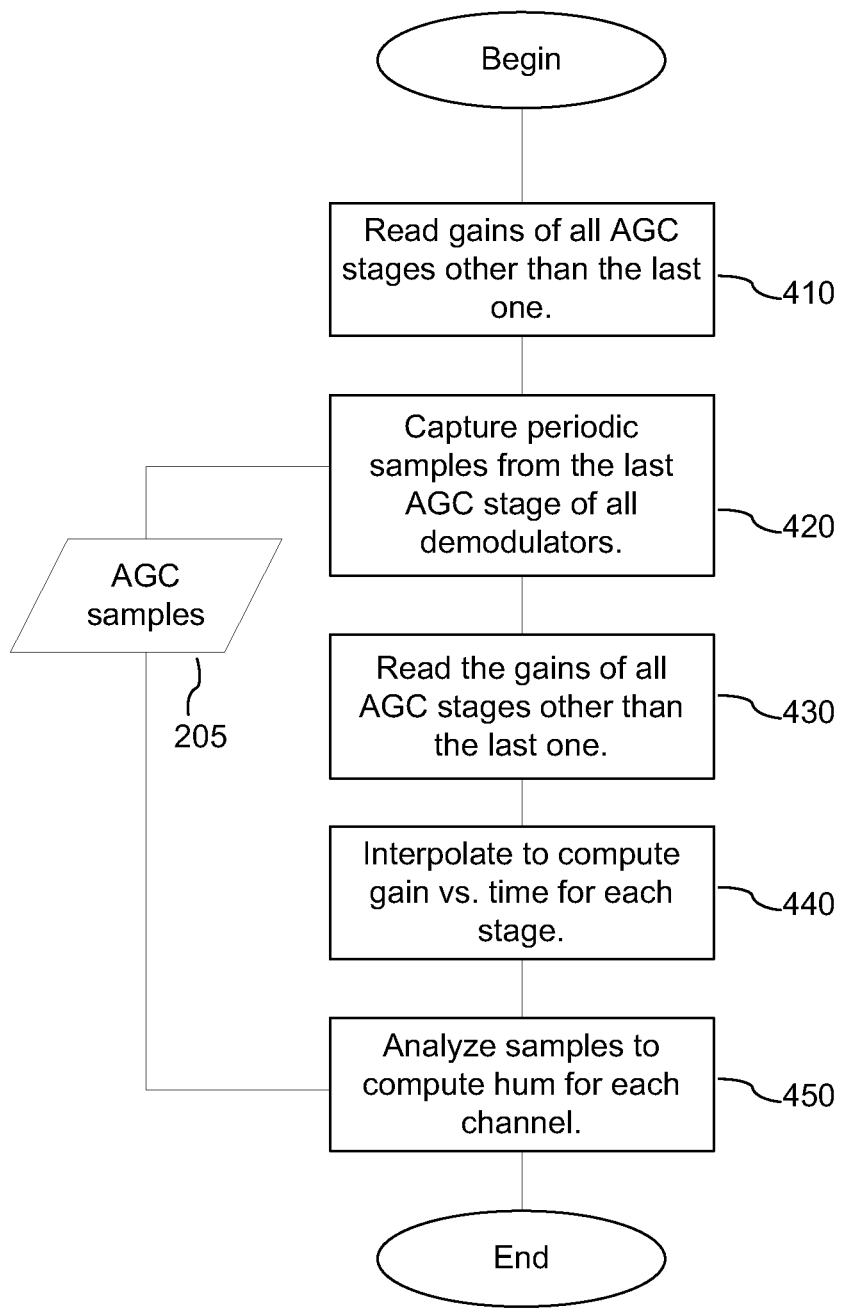
FIG. 6 is a flowchart illustrating AGC data collections steps for measuring Hum according to another embodiment of the present invention.

With reference to FIG. 6, in one embodiment the controller 210 may collect AGC gain samples from the last AGC stage 780 without locking the gain in any of the preceding AGC stages 112, 124; this approach may be used, for example, if the QAM demodulators 130 cannot stay locked at the respective QAM channels for the duration of the data capture with all but the final AGC gain stage locked, or if the AGC stages 112, 124 provide no locking mechanism. In this embodiment the AGC gains of all AGC stages that precede the final AGC stage are first read at step 410 before capturing at step 420 the desired number of AGC samples from the final AGC stage 780, and at step 430 the AGC gains of the preceding AGC stages are read again when the capture of the AGC gain samples from the last AGC stage is complete. The capture of the periodic AGC samples at step 420 to obtain the sequence of AGC samples 205 may be performed in substantially the same way as in step 320 of the process of FIG. 5. At step 440 an interpolation procedure can be used to estimate the AGC gain vs. time function for each AGC stage during the data capture. The analysis of the captured sequence 205 of AGC samples from the last AGC stage, which is performed at step 450, takes these varying gains into account. Depending on the bandwidth of the preceding AGC stages, i.e. the AGC stages 112, 124 in the embodiment of FIG. 2, it may be necessary to read AGC gain values in some of them repeatedly during the data capture at step 420 as well as before and after the data capture at steps 410, 430.

Before performing the steps illustrated in FIGS. 5 and 6, the controller 210 may receive from the user, or read from a saved measurement plan, input parameters for the QAM channel or channels to be measured, and then generate control signals for tuning the DTV receiver 100 to the selected QAM channels. The input parameters may include a QAM carrier frequency of a particular QAM DTV channel or channels, and may also include specific parameters defining QAM type, symbol rate, and a particular standard according to which the measurements are to be performed. By way of example, these parameters may be 801 MHz, 256 QAM, 5.361 Msps, and Annex B (of ITU-T J.83).

Figure 7:
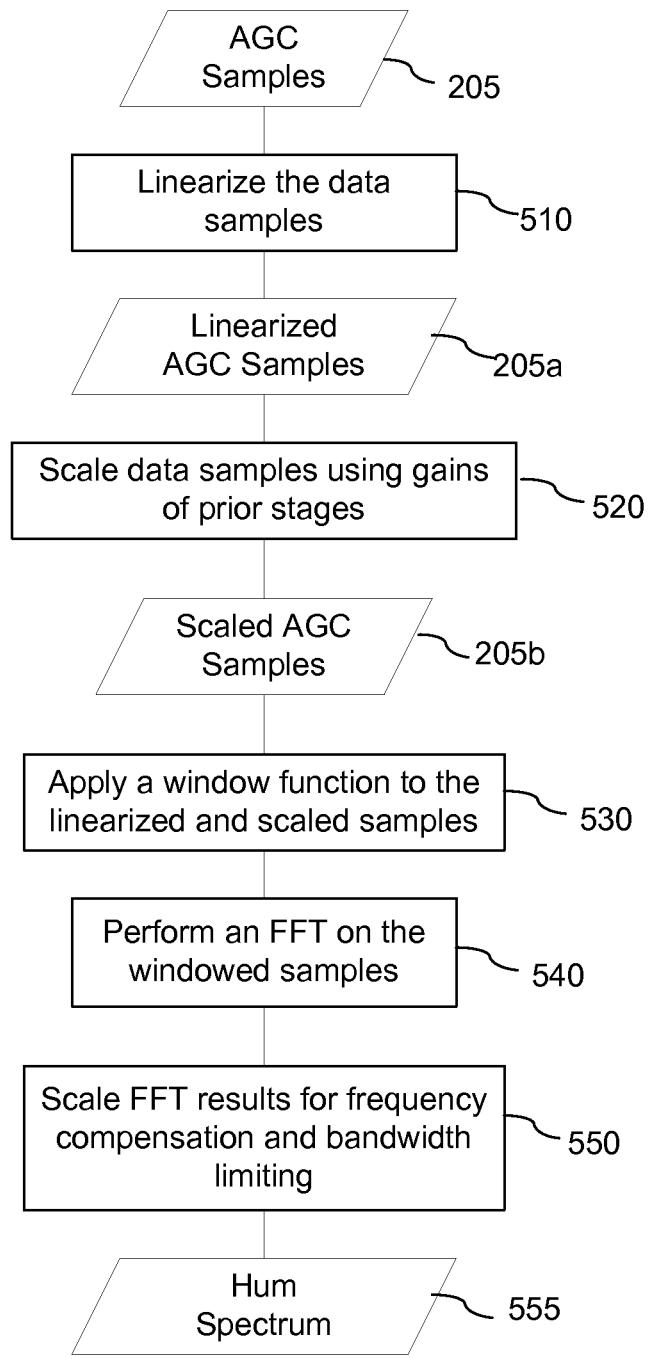
FIG. 7 is a flowchart of AGC sample processing according to an embodiment of the invention.

Turning now to FIG. 7, in one embodiment the controller 210 computes a frequency-domain Hum in a QAM channel based on the Hum analysis sequence 205 using a process that includes the following steps. First, at step 510 the sequence of AGC samples 205 captured at steps 320 or 420 are linearized using a suitable function that depends on the ASIC design of the DTV receiver 100 to obtain a sequence 205a of linearized AGC samples $\{y_i\}$. By way of example, for a typical DTV receiver's ASIC this linearization procedure may include performing the following transformation:

$$y_i = \frac{A}{B + x_i} \quad (1)$$

where $x_i$ denotes values of the AGC samples captured from the DD-AGC gain register 765 of the last AGC stage 780, i=1, ..., N, where N is the number of captured AGC samples, $y_i$ denotes values of the linearized AGC data, and 'A' and 'B' are constants that may depend on the ASIC design. The linearization procedure exemplified by equation (1) correspond to a transformation, or mapping, of the AGC gain values to values of a carrier amplitude of the QAM signal as seen from the input of the DD-AGC mixer 755.

At step 520, the linearized AGC data 205a is scaled using AGC gains of the preceding stages read at step 330 of the process of FIG. 5, or the gain functions computed at step 440 of the process of FIG. 6, and a suitable scaling function that depends on the ASIC's design, resulting in a sequence of scaled AGC samples 205b. The processing in steps 510, 520 effectively maps AGC gain values read from the AGC register 765 to values of the carrier amplitude of the QAM signal 127 at the input of the QAM demodulator 130, which variation in time represent Hum. Accordingly, the sequence 205b of the linearized and scales AGC samples may also be referred to as a sequence of the carrier amplitude values. In one embodiment, the processing at steps 510, 520 converts the 'raw' AGC samples as read from the DD-AGC register 765 to a voltage scale; after this conversion, variations in the DD-AGC register values as sampled by the controller 210 become proportional to variations in the voltage level of the QAM channel in the DTV signal 103 received by the DTV receiver 100. One skilled in the art will appreciate that suitable look-up tables can be used to perform the data conversions in steps 510, 520 instead of using mathematical formulas.

At step 530, a window function such as a Hann window may be applied to the linearized and scaled AGC data if desired to reduce effects of the finite data size in subsequent processing. At step 540, a fast Fourier transform (FFT) is applied to the adjusted time-domain AGC data to obtain an AGC frequency response, or spectrum. At step 550, the AGC frequency response is optionally scaled to compensate for the limited bandwidth of the sampled AGC stage, and possibly to limit the bandwidth of the resulting Hum measurement. Suitable coefficients for this scaling may be determined for example by an analysis of the ASIC design or by experimental calibration of the sampled AGC response to known variations of the input signal to the DTV receiver 100 or the QAM modulator 130. In one exemplary implementation, these scaling coefficients r are computed for each frequency f based on the following function:

$$r = 1/(1+af^p) \quad (2)$$

where f is in kHz, a=0.00383, and p=2.08. The magnitudes of each FFT result, multiplied by their corresponding compensation coefficients, give the hum power vs. frequency. Other DTV receiver designs may require a different scaling function, which a skilled technician will be able to obtain without undue experimentation.

Equations or look-up tables to be used in steps 510, 520 and 550 to linearize and scale the AGC data and the corresponding AGC spectral response can be obtained by mathematical analysis of the ASIC embodying the DTV receiver 100, by simulation of its internal architecture, or by capturing and analyzing several QAM signals with known hum amplitudes. A triangle wave amplitude modulation of a QAM signal may be useful for determining the particular form of the linearizing calculation performed in step 510.

In one embodiment, the frequency response 555 obtained at step 540 or 550, may be saved in the non-volatile memory 230 for future use. This frequency response is indicative of the frequency spectrum of Hum in the respective QAM channel, and is also referred to herein as the Hum spectrum. In one embodiment, the user interface 220 may display the Hum frequency spectrum 555 graphically with a display, or the Hum spectrum 555 may be sent to a remote system via the network interface 211. The controller 210 may also sum the magnitudes of individual FFT points to get Hum power in frequency bands of interest. These might include the fundamental power line frequency, its harmonics, and the high-frequency band encompassing typical switching power supply frequencies.

In one embodiment, the controller 210 may also compute an inverse FFT of the frequency-compensated FFT results in order to obtain a sequence of time-domain samples $u_t$ of a relative carrier amplitude of the input QAM signal. The user interface 220 may display this sequence directly, and may display this sequence for multiple QAM channels in different colors.

In an embodiment wherein the DD-AGC registers 765 of multiple QAM demodulators 130 are sampled at step 320 or 420 to measure Hum in different QAM channels, the controller 210 may compute inter-channel Hum correlation coefficient for two different QAM channels. In one embodiment, the correlation of two QAM channels captured concurrently can be computed using the equation $$\text{corr} = \frac{2\sum_{t=1}^{N}(u_t - \bar{u})(v_t - \bar{v})}{\sum_{t=1}^{N}[(u_t - \bar{u})^2 + (v_t - \bar{v})^2]} \quad (3a)$$

where $u_t$ and $v_t$ denote the time domain samples computed using the inverse FFT of the AGC spectra 555 for the two QAM channels, and symbols $\bar{u}$ and $\bar{v}$ represent the average values of the samples in each sequence:

$$\bar{u} = \sum_{i=1}^{N} u_i, \; \bar{v} = \sum_{i=1}^{N} v_i \quad (3b)$$

In other embodiments, the Hum correlation coefficient 'corr' may be computed for the AGC sample sequences obtained at earlier stages of the processing illustrated in FIG. 7, such as the AGC sample sequence 205b, 205a, or 205. Alternatively, in other embodiments the AGC samples may undergone additional processing before computing the Hum correlation coefficient, as desired for a particular application. The Hum correlation coefficient 'corr' defined by equation (3a) ranges from 0, which means no correlation, to 1, which means perfect correlation. Values of the inter-channel Hum correlation coefficient 'corr' provide useful information about possible sources of Hum. For example, high correlation between any two QAM channels may indicate a defective amplifier. Hum on only one QAM channel suggests a defective QAM modulator. Correlated Hum on all channels in a DTV signal coming from a single device, such as a cable modem termination system (CMTS) or a multi-purpose QAM modulator known as 'Edge QAM', may indicate a defective power supply in that device.

Correlation equation (3) or the like could also be used by the controller 210 to estimate correlation between two sequences of AGC samples that are captured at two different times and/or two different locations in a network, either for a same QAM channel or for different QAM channels. In order to obtain a meaningful correlation coefficient, AGC captures 205 taken at different times must be coordinated in time, i.e. represent analogous portions of the Hum signal. If the Hum signal is periodic, the AGC captures should represent the same portion of a period of the periodic Hum waveform. The Hum signal may be complex, in particular if it is an aggregate of multiple periodic impairments with different characteristic frequencies.

Figure 8:
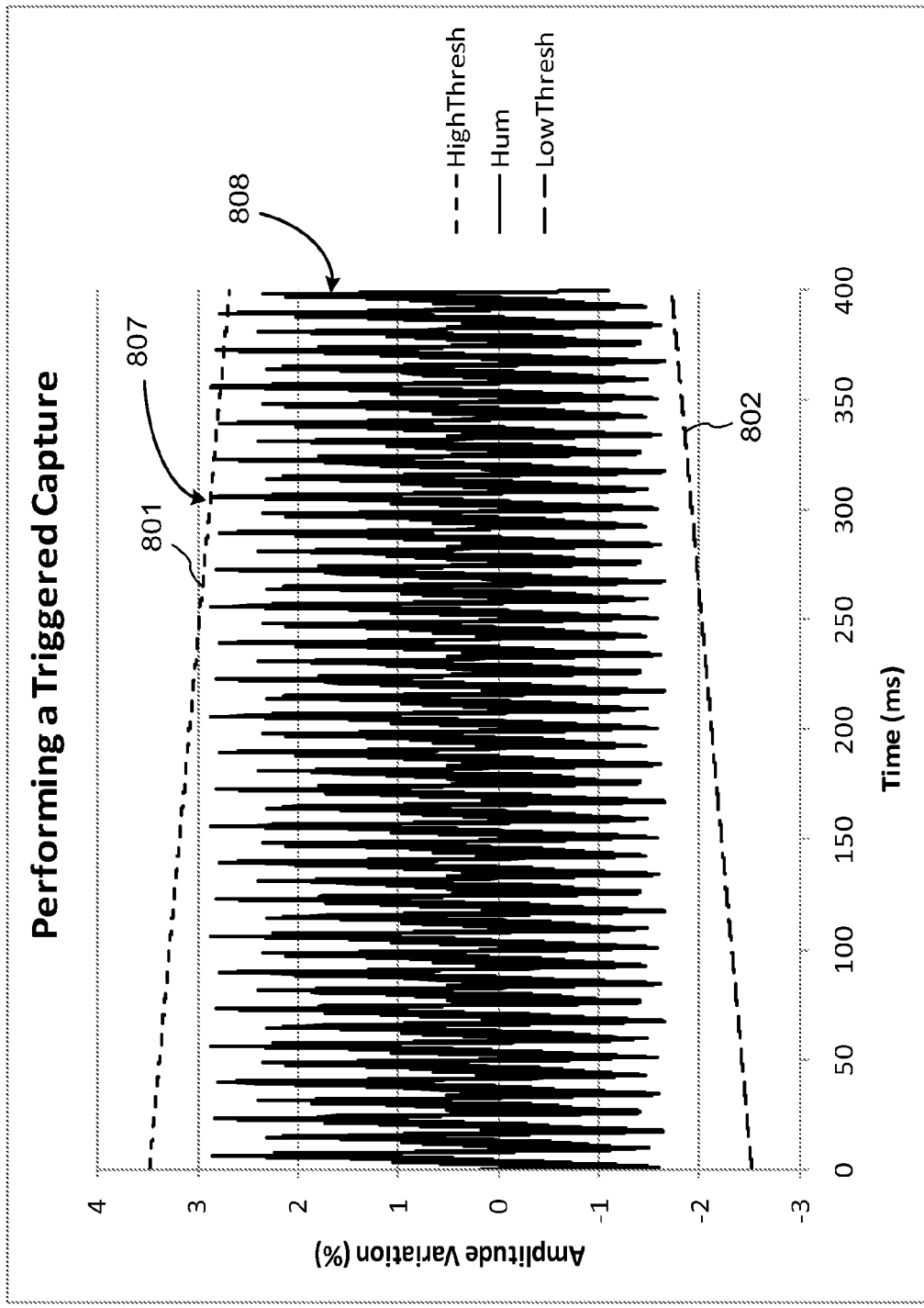
FIG. 8 is a graph illustrating simulated composite Hum in a time-domain AGC signal obtained according to the present invention.

By way of example, FIG. 8 illustrates a simulated AGC signal 808, mapped to the carrier amplitude at the input of the DTV receiver as described hereinabove with reference to FIG. 7, in the presence of simulated Hum in which two distinct sources of periodic Hum are combined: a Hum component which comes from a 60 Hz power source with a defective full-wave rectifier, and a Hum component from a high-speed switching power supply with inadequate filtering. In the absence of Hum the AGC signal 808 would be of a constant value, so that the time-dependent AGC signal 808 may also be referred to as the Hum signal. In FIG. 8, a 1 kHz switching rate of the high-speed switching power supply is assumed for the purpose of visualization; in practice the switching rate is likely to be 50 kHz or higher. As can be seen from FIG. 8, the Hum signal 808 is a periodic signal with a complex structure, including peaks of different heights. In one embodiment of the present invention, the controller 210 utilizes slowly narrowing thresholds 801, 802 to detect main peaks in the Hum signal 808 or the like, and to capture portions thereof having one of the main peaks 807 at a pre-determined desired location within the captured portion.

Figure 9:
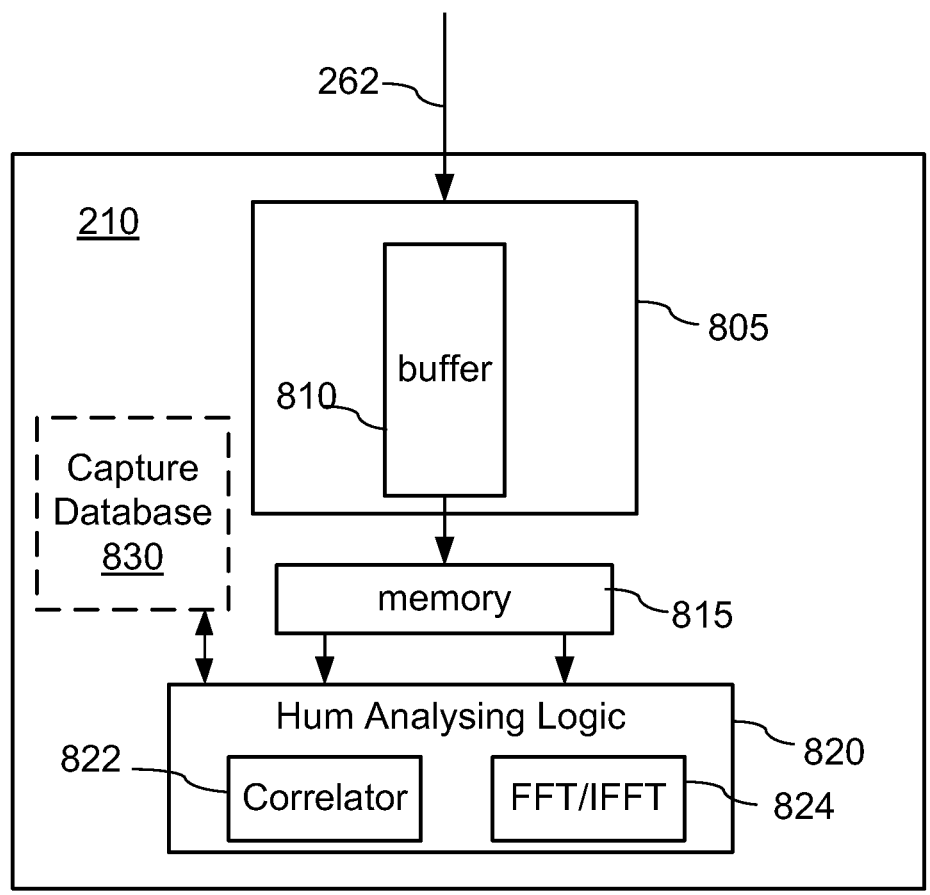
FIG. 9 is a schematic block diagram of a Hum analyzing logic of the testing device of FIG. 4 including a circular buffer.

With reference to FIG. 9, in one embodiment HAL 215 of the controller 210 includes data capture logic (DCL) 805 for triggering the capture of the AGC samples on a selected feature of the time-domain AGC signal, such as time time-domain peaks in the AGC response 808, using a circular buffer (CB) 810 for the capture. In the context of this specification, the terms 'positive peak' and 'negative peak' may refer to a relative polarity of the respective peak in the captured sequences of AGC samples, so that for example 'negative peak' may refer to a peak that extends below a steady-state or average level of the respective AGC signal, and 'positive peak' may refer to a peak that extends above the steady-state or average level of the respective AGC signal. In this embodiment, the stream of AGC samples 263, which are read by the controller 210 from the AGC register of the final AGC stage of the QAM demodulator 130, is fed to the CB 810 sample by sample, while the slowly-narrowing thresholds 801, 802 (FIG. 8) are used by the DCL 805 to trigger a capture of the content of CB 810 in memory 815 for further analysis when a peak AGC sample that violates a threshold is detected within the CB 810. Each captured sequence of AGC samples may contain both pre- and post-trigger data. The DCL 805 of the controller 210 may capture and save in memory 815 a set of such triggered sequences of AGC samples. In one embodiment the captured AGC sequences are saved so that, when correlating two AGC sequences taken at different times, the controller 210 can match the directions of the threshold violations, and compute the correlation of sequences with peaks of the same polarity, either two positive peak sequences or two negative peak sequences. In other embodiments, a single slow-varying threshold can be used to trigger the capture on either positive or negative peaks in the time-domain AGC signal.

The captured sequences of AGC samples, which are now time-correlated, i.e. represent substantially same portions of a period of the Hum signal waveform 808, may be forwarded from memory 815 to a Hum processor 820 for further processing and analysis. This processing may include, for example, the scaling and linearization procedures that are described hereinabove with reference to FIG. 7. The Hum processor 820 may further include an FFT/IFFT block for performing the Hum spectral analysis and optionally obtaining a frequency-compensated time-domain Hum signal as described hereinabove, and a correlation block 822 for computing the correlation coefficient between time-correlated AGC sequences, including the AGC sequences captured concurrently from different QAM modulators 130, and the triggered AGC sequences captured using the CB 810 at different times.

Figure 10:
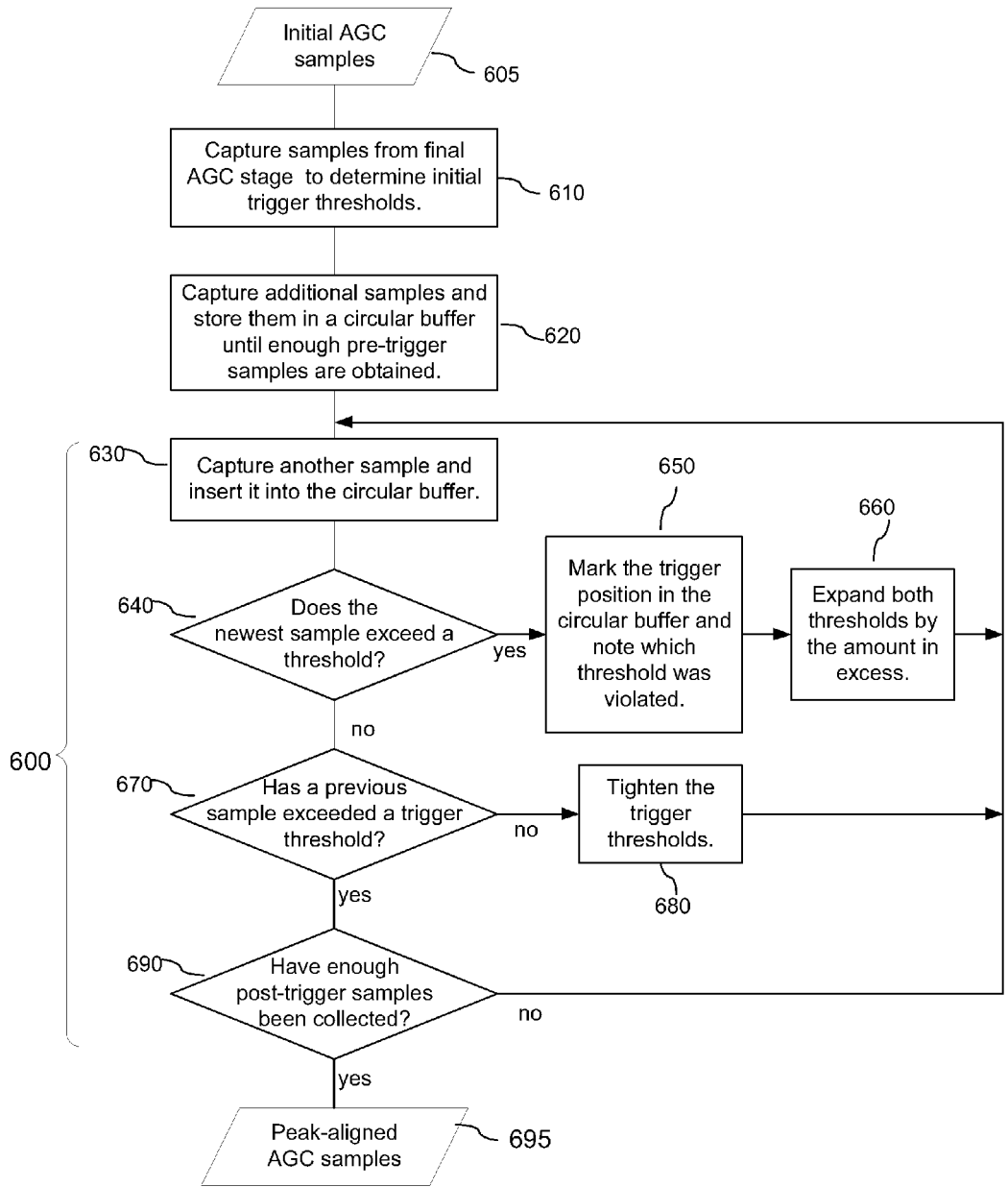
FIG. 10 is a flowchart illustrating a process of capturing a peak-aligned sequence of AGC samples using a circular buffer.

Referring now to FIG. 10, there is illustrated one embodiment of a process that DCL 805 may be programmed to implement for capturing sequences of AGC samples that have a positive or negative time-domain peak at a pre-determined position in the sequence. This process may be used in steps 320 or 420 described hereinabove with reference to FIGS. 5 and 6, respectively, in one embodiment of the invention.

At step 610, an initial value or values for the trigger thresholds 801, 802 is/are chosen by analyzing a representative sequence 605 of AGC samples captured from the AGC register of the final AGC stage of the QAM demodulator 130, such as the DD-AGC register 765. This AGC sequence 605 is preferably at least as long as the ones used for Hum analysis by the Hum processor 820. These AGC samples may first be linearized and scaled, as described hereinabove with reference to FIG. 7, steps 510 and 520, although that may not be necessary in order to implement the triggering logic illustrated in FIG. 10 and described hereinbelow. Both upper and lower thresholds 801, 802 may be computed in step 610 by finding the highest and lowest values in the initial sample data 605. The initial values of the thresholds 801, 802 may be selected so as to be above and below the highest and lowest values in the initial sample data 605, respectively, by a desired margin; by way of example, this margin may be chosen based on the standard deviation and skewness of the sample data 605.

At step 620, periodic AGC samples read by DCL 805 from the final AGC stage 765 at the sample rate R are loaded into the CB 810, which is large enough to hold the Hum analysis sequence 205. The CB 810 is used to store consecutive AGC samples before and after a trigger event, which is the detection of an AGC sample violating, i.e. crossing, one of the thresholds 801, 802. During step 620, the AGC samples may be added to the CB 810 until a desired number of pre-trigger AGC samples is obtained. The AGC samples collected at step 610 may be used if DCL 805 can compute the initial trigger thresholds without adding any extra time delay between samples.

Once the CB 810 contains the desired number of pre-trigger AGC samples, the DCL 805 may execute a loop 600 until triggering occurs. In this loop, each new sample is added to the circular buffer 810 at step 630. If the circular buffer 810 is full, the oldest sample in the buffer is discarded to make room for a new AGC sample. At step 640, the new sample is compared to one or both of the trigger thresholds 801, 802. Triggering occurs if the new AGC sample is above the upper threshold 801 or below the lower threshold 802. At step 650, the trigger position within the CB 810, and which threshold was violated, may be stored along with the captured data.

After triggering, one or both thresholds may be expanded in step 660 by the difference between the AGC sample value and the threshold it violated. This enables the DCL 805 to retrigger should one of post-trigger samples received by the CB 810 has a more extreme value that the one caused the initial triggering.

If no AGC samples have yet exceed the thresholds at step 670, at step 680 the trigger thresholds are tightened, that is the upper threshold 801 is slightly decreased and the lower threshold is slightly increased. In one embodiment, the rate of threshold tightening is selected to be relatively slow so as to allow the DCL 805 to continue searching for a certain duration of time, for example several seconds, until a peak is found. This rate may be configurable by the user.

When triggering occurs, the circular buffer 810 contains only pre-trigger samples and the 'peak' AGC sample that caused the triggering. A preferred embodiment will continue capturing AGC samples until a desired number of post-trigger samples is obtained, as verified at step 690. In one embodiment, new post-trigger AGC samples continue to be added until 50% of the buffer 810 contains post-trigger samples. The other half of the buffer will have the most recent pre-trigger samples and the sample that caused triggering. Accordingly, selecting the numbers of pre-trigger and post-trigger AGC samples determines the position of the peak AGC sample in the final captured sequence of AGC samples. The number of pre-trigger AGC samples is also referred to herein as the first number of AGC samples, while the number of post-trigger AGC samples is also referred to herein as the second number of AGC samples.

Figure 11:
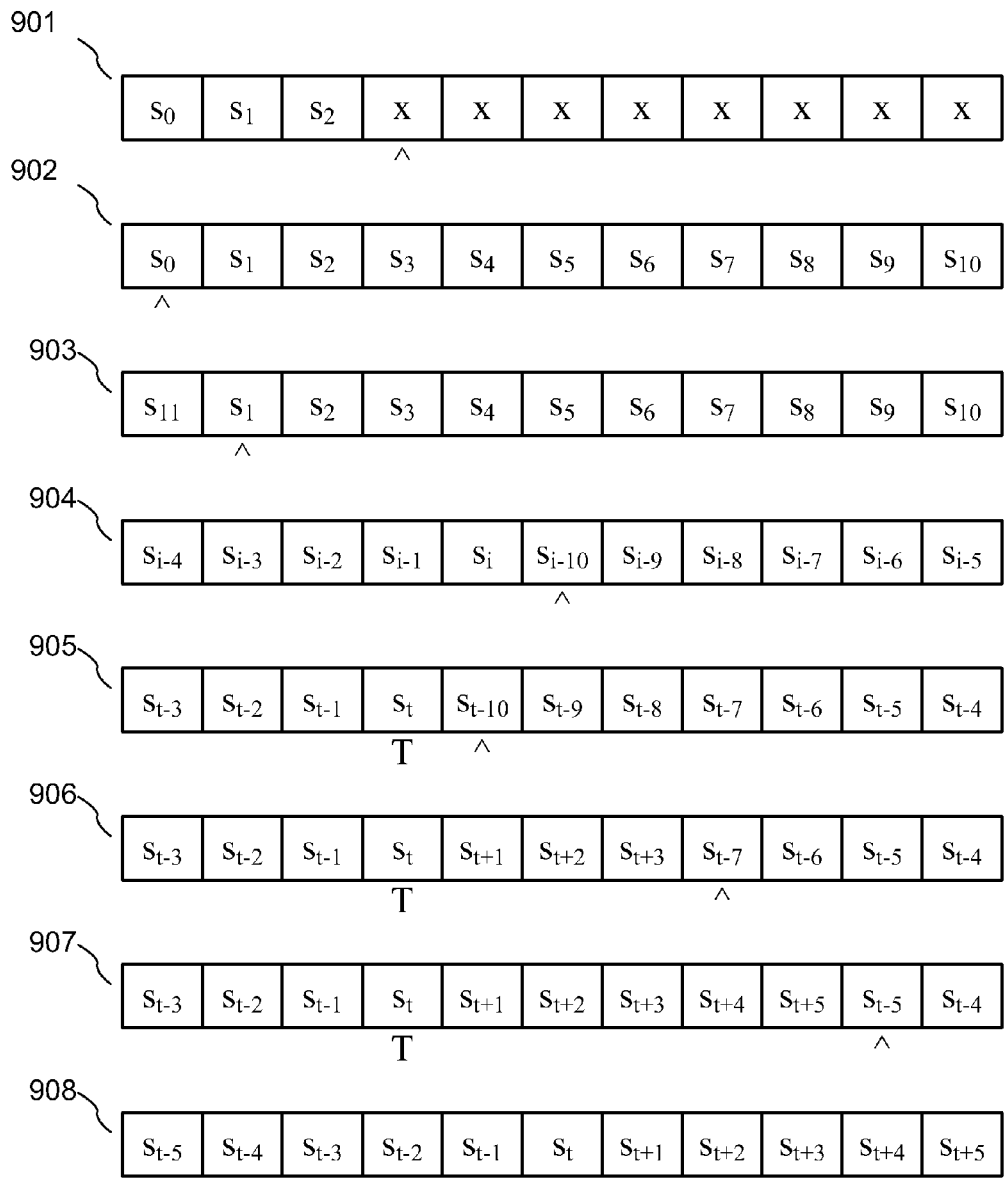
FIG. 11 is a schematic diagram illustrating the content of the circular buffer at different stages of the process of capturing the peak-aligned sequence of AGC samples.

With reference to FIG. 11, the process of filling of the CB 810 and selecting a peak-aligned sequence of AGC samples is illustrated by way of example for an illustrative CB 810 that is 11 samples long. Rows 901 to 907 represent various fill states of the CB 810 during the process of capturing a peak-aligned sequence of AGC samples. Row 908 illustrates the resulting peak-aligned sequence at the end of the process, as may be stored in a linear buffer or memory 815, to which the content of the CB 810 may be copied once the capture of the peak-aligned sequence of AGC samples to the CB 810 is complete. By way of example and for illustration purposes only, the CB 810 in this figure is 11 samples long, although in a typical embodiment the length of CB 810 is much greater. Further by way of example, the minimum number of pre-trigger samples is assumed to be 5. The caret symbol '^' shows the next sample insertion point. 'T' indicates the position at which the AGC sample violating a trigger threshold has been inserted. Each sample insertion moves the insertion point right one position. Symbol 'X' indicates an empty, or not-yet-filled sample position within the buffer. Symbols '$s_i$,' indicate an i-th consecutive AGC sample received by the CB 810. Row 901 illustrates the initial filling of the CB 810 with pre-trigger samples in step 620, with three filled positions and 8 empty positions. Row 902 illustrates the CB 810 which is just filled, and the insertion point wraps around to the beginning of the buffer. Next sample $S_{11}$ replaces the previous first sample $s_0$ in the buffer, as illustrated in row 903. Each new sample replaces the oldest sample in the buffer. The insertion point continues to moves right, always pointing to the oldest sample. Row 904 illustrates the state of the buffer 810 before triggering, after the $i^{th}$ sample is inserted. The triggering sample $s_t$ that violates one of the thresholds could come at any time, so it could be placed anywhere in the buffer 810. Row 905 illustrates an exemplary case wherein the triggering sample denoted $s_t$ is inserted at the fourth position in the buffer, with label 'T' marking the trigger position. As post-trigger samples $s_{t+1}$, $s_{t+2}$, etc, are added, the oldest pre-trigger samples $S_{t-10}$ through $S_{t-6}$ are replaced with the newest samples while the desired five pre-trigger samples $S_{t-5}$ through $S_{t-1}$ are kept, as illustrated in row 906. Row 907 illustrates a state of the CB 810 when a desired number of post-trigger samples is captured, and the post-trigger capture is stopped. At this point the content of the CB 810 may be copied to a linear buffer starting with the oldest sample, as illustrated at 908. In one embodiment the post-trigger captures are stopped once the buffer contains equal numbers of pre- and post-triggered samples. The process results in a capture of the sequence 908 of AGC samples having a peak AGC sample at a pre-determined position therein, such as in the center of the sequence. This sequence 908 is referred to herein as the aligned AGC sequence, or more particularly as the peak-aligned AGC sequence.

Figure 12:
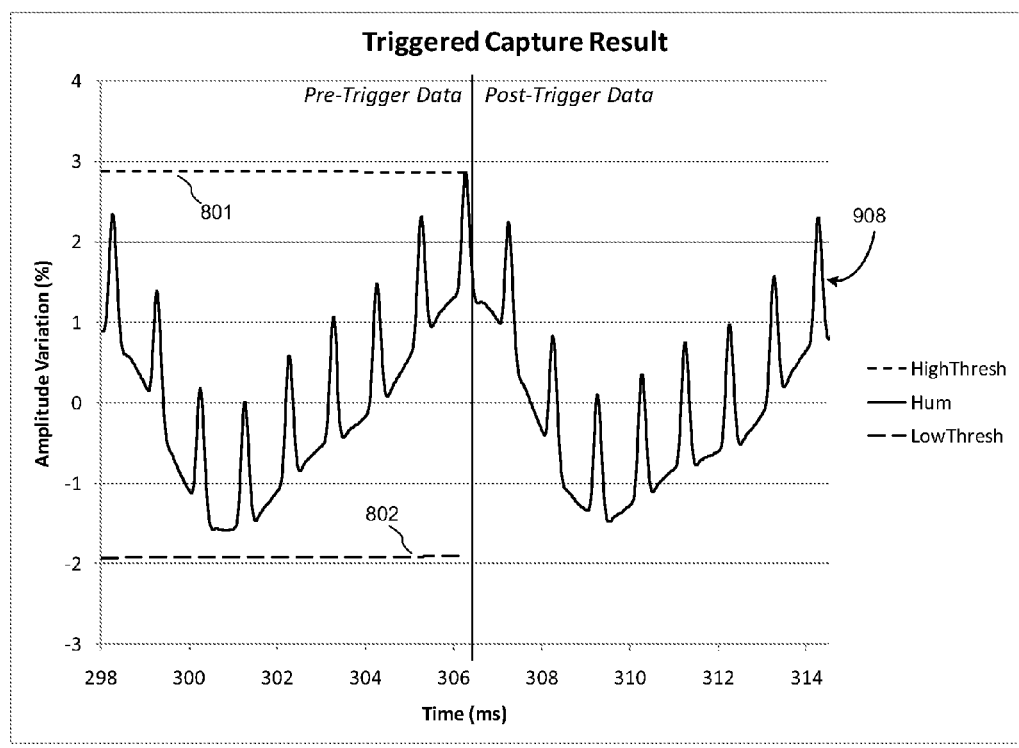
FIG. 12 is a graph illustrating an exemplary peak-aligned sequence of AGC samples in the simulated AGC signal of FIG. 8.

By way of example, FIG. 12 illustrates a portion of the AGC signal 808 of FIG. 8 that may be captured by the process of FIG. 10 as the peak-aligned sequence of AGC samples 908. In the shown example, the triggered AGC sequence 908 is about 16 ms long, and the capture of this sequence is triggered by a sample 807 at one of the main positive peaks in the ACG signal 808 (FIG. 8), which occurs at approximately 306.3 ms, The capture is triggered by receiving an AGC sample 807 that crosses, i.e. in this case just exceeds, the positive threshold 801.

Figure 13:
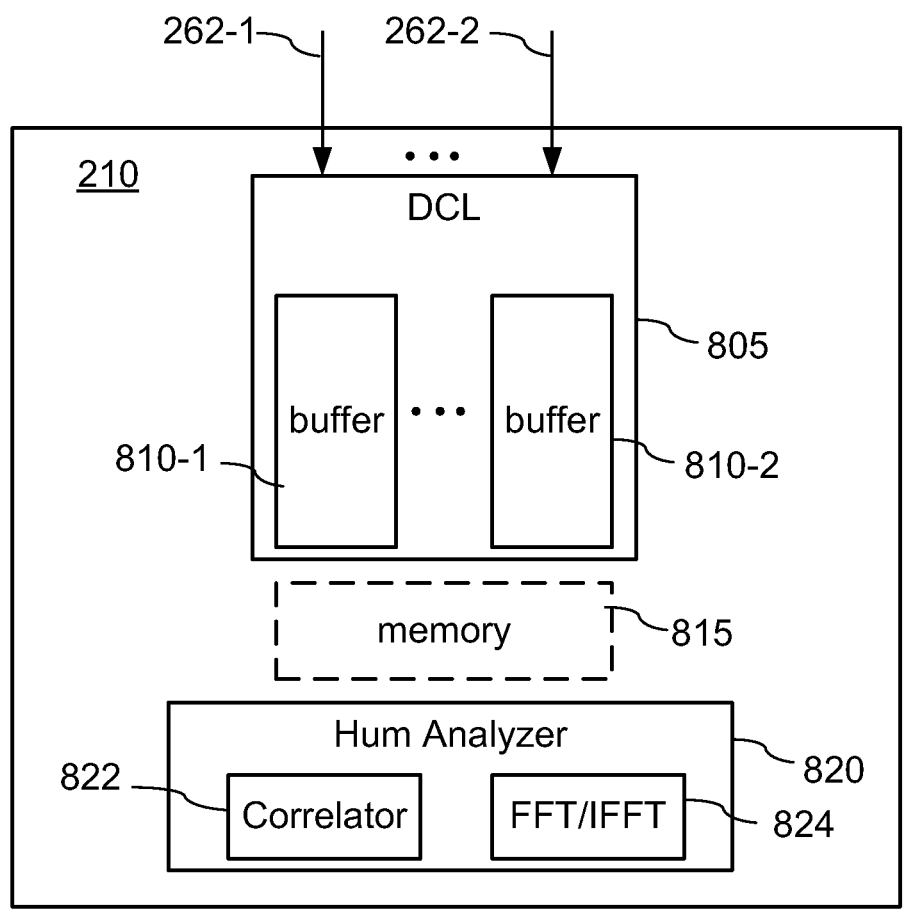
FIG. 13 is a schematic block diagram of a Hum analyzing logic of the testing device of FIG. 4 including multiple circular buffers.

With reference to FIG. 13, in one embodiment DCL 805 of the controller 210 may include a plurality of circular buffers 810, of which two labeled 810-1 and 810-2 are shown in the figure by way of illustration. In such embodiments the controller 210 may utilize separate memory buffers 810-$i$ for each aligned sample sequence, indexing each of them in a circular manner, or it may use one circular buffer for all captures, and copy the results of each capture to separate linear buffers for storage and comparison. Memory 815 may be omitted, and the Hum processing logic 820 may read the peak-aligned sequences of AGC data directly from the CBs 810. In one embodiment, the circular buffers 810-$i$, i=1, 2, . . . , may receive AGC data from the DD-AGC stages of different QAM demodulators 130 of the DTV receiver 100, so that for example the circular buffer 802-1 may receive AGC samples from the first QAM demodulator 130$_1$ over a first communication link 262-1, while the circular buffer 802-2 may receive AGC samples from the second QAM demodulator 130$_2$ over a second communication link 262-2.

In order to measure Hum at higher frequencies, the controller 210 may read the modulation error ratio (MER) from each QAM analyzer 130 before beginning a Hum capture. If the MER is above a predetermined threshold, the controller 210 may increase the bandwidth of the final AGC stage 780. It may increase this bandwidth progressively in order to obtain a maximum MER. The controller may also adjust the AGC capture sample rate R and possibly the number of AGC samples captured to correspond to the chosen AGC bandwidth.

Referring back to FIG. 9, in one embodiment the controller 210 includes memory for storing a database 830 of captured sequences of AGC samples, such as the peak-aligned AGC sample sequences described hereinabove, along with a description of a particular component failure associated therewith. When the controller 210 performs a new triggered AGC capture, it can compute the correlation between the newly captured peak-aligned AGC sequence and all those in the database 830. If a stored AGC capture correlates highly with the new AGC capture, the description of the associated component failure may help the technician locate and fix the problem. After identifying a problem, whether or not it was found by correlation with the database, the technician may add the new AGC capture to the database, along with a description of the component problem.

Although the tester 200 is described hereinabove in the context of measuring Hum, the tester 200 may be embodied as a test instrument that also performs a variety of RF signal measurements and CATV service tests. In one embodiment, the tester 200 is a battery powered device, such as a hand-held battery powered device for performing integrated measurements of quality parameters for QAM DTV signals in a cable network.

Although the invention has been described hereinabove with reference to specific exemplary embodiments, it will be appreciated that other embodiments and various modifications of the described embodiments are possible and will be within the scope of the present invention, as defined by the appended claims. For example, It will be appreciated that the sequences of steps described hereinabove with reference to FIGS. 5-7 and 10 are exemplary, and may be modified as required by a particular application, for example to provide additional or different Hum characteristics. Some of the data processing steps described hereinabove for processing the AGC values collected by the controller 210 may be omitted, and other steps added, for example as required for a particular application. For example, suitable scaling of the data can be performed at various stages of the data processing, or raw un-scaled data may be saved for future processing, and/or used to compute and display some of the Hum related parameters, such as but not limited to HPVR, Hum spectra and Hum correlation coefficients.

It should also be understood that each of the preceding embodiments of the present invention may utilize a portion of another embodiment. Of course numerous other embodiments may be envisioned without departing from the spirit and scope of the invention.

I claim:

1. A method for measuring Hum in a digital television (DTV) signal comprising quadrature amplitude modulation (QAM) signals using a testing device for testing QAM signals on a cable television (CATV) network, the method comprising:

a) receiving the DTV signal with the testing device, the testing device comprising a DTV receiver and a controller coupled thereto, the DTV receiver comprising a first QAM demodulator for demodulating a first QAM signal comprised in the DTV signal, wherein the DTV receiver further includes a plurality of automatic gain control (AGC) stages in a signal path of the first QAM signal, each AGC stage comprising an AGC register for storing a current AGC gain value of the respective AGC stage, b) sampling values stored in one of the AGC registers at a pre-defined sampling rate R that exceeds two times a Hum frequency to obtain a first sequence of AGC samples; and, c) using the controller to store and analyze the first sequence of AGC samples, or at least a portion thereof, for evaluating Hum in the first QAM signal.

2. The method of claim 1, wherein the one of the AGC registers is comprised in a final AGC stage of the DTV receiver.

3. The method of claim 2, wherein the final AGC stage comprises a decision-directed AGC (DD-AGC) circuit of the first QAM demodulator, and wherein the one of the AGC registers is a DD-AGC register of the first QAM demodulator.

4. The method of claim 3, comprising using the controller to analyze the first sequence of AGC samples at frequencies greater than 8 kHz for detecting the presence of a high-frequency Hum related to defective switching power suppliers.

5. The method of claim 3, further comprising using the controller for:
obtaining a second sequence of AGC samples from the DTV receiver, and
computing a correlation between the first and second sequences of AGC samples to estimate a degree of Hum correlation therebetween.

6. The method of claim 5, wherein the DTV receiver includes a second QAM demodulator for demodulating a second QAM signal comprised in the DTV signal, the second QAM demodulator comprising a DD-AGC circuit including a DD-AGC register, the method further comprising:
sampling values stored in the DD-AGC register of the second QAM demodulator to obtain the second sequence of AGC samples; and,
providing said second sequence to the controller to evaluate Hum in the second QAM signal.

7. The method of claim 6, wherein the first and second QAM signals are obtained by receiving the DTV signal at two different locations in a DTV network or at different times in a same location.

8. The method of claim 5, wherein each of the first and second sequences of AGC values is selected so at to have a peak AGC value at a same position therein.

9. The method of claim 8, comprising selecting each of the first and second sequences of AGC samples by performing the steps of:
sequentially feeding AGC samples from the one of the AGC registers to a circular buffer;
once the circular buffer contains at least a first pre-determined number of AGC samples, comparing each subsequent AGC sample being fed to the circular buffer to a trigger threshold;
if the AGC sample being fed to the circular buffer crosses the trigger threshold, saving the content of the circular buffer in memory after feeding to the circular buffer a second pre-determined number of AGC samples from the one of the AGC registers, wherein the second pre-determined number of AGC samples is the same for the first and second AGC sequences.

10. The method of claim 9 wherein, if a predetermined number of consecutive AGC samples being fed to the circular buffer do not cross the trigger threshold, the trigger threshold is gradually reduced in magnitude relative to the AGC samples until one of the subsequent AGC samples crosses the trigger threshold.

11. The method of claim 1, wherein step c) comprises linearizing the first sequence of AGC samples.

12. The method of claim 1, wherein step c) comprises scaling the first sequence of AGC samples, or the at least a portion thereof, using AGC register values obtained from one or more of preceding AGC stages.

13. The method of claim 1, wherein step c) comprises applying a window function to the first sequence of AGC samples, or the at least a portion thereof to obtain a sequence of windowed samples, and obtaining a frequency spectrum of the AGC samples by performing a fast Fourier transform (FFT) operation on the sequence of windowed samples to evaluate Hum.

14. A testing device for testing a digital television (DTV) signal on a cable television (CATV) network, comprising:
an input port for receiving the DTV signal;
a DTV receiver comprising a first QAM demodulator for demodulating a first QAM signal comprised in the DTV signal, the DTV receiver further comprising a plurality of automatic gain control (AGC) stages in a signal path of the first QAM signal, wherein the plurality of AGC stages comprises a final AGC stage within the first QAM demodulator, and one or more preceding AGC stages, the final AGC stage comprising an AGC register for storing a current AGC gain value thereof;
a controller coupled to the DTV receiver for tuning the DTV receiver to the first QAM signal and for sampling the content of the AGC register of the final AGC stage; and,
an output device coupled to the controller;
wherein the controller is programmed to perform operations comprising:
a) sampling values stored in the AGC register of the final AGC stage at a pre-defined sampling rate R that exceeds a Hum frequency to obtain a first sequence of AGC samples; and,
b) analyzing the first sequence of AGC samples to obtain one or more Hum characteristics; and,
c) providing the one or more Hum characteristics to the output device for storing therein or reporting to a user.

15. The testing device of claim 14, wherein the final AGC stage is a decision-directed (DD) AGC circuit of the first QAM demodulator, further comprising a communication link between the controller and the AGC register of the DD AGC circuit for providing the first sequence of AGC samples to the controller.

16. The testing device of claim 14, wherein the DTV receiver comprises a second QAM demodulator coupled to the controller for providing a second sequence of AGC samples thereto.

17. The testing device of claim 16, wherein the controller comprises a Hum correlator for computing a Hum correlation coefficient based on the first and second sequences of AGC samples.

18. The testing device of claim 15, wherein the controller comprises data capture logic including a circular buffer, wherein the data capture logic is programmed for:
sequentially feeding AGC samples from the AGC register to the circular buffer, and selecting the first sequence of AGC samples so as to have a peak AGC sample at a pre-defined position therein.

19. The testing device of claim 15, wherein the controller comprises:
- a memory for storing the first sequence of AGC samples therein, and
- a Hum correlator for computing a Hum correlation coefficient based on the first sequence of AGC samples and a second sequence of AGC samples, which is obtained from the DTV receiver at a different time from the first sequence of AGC samples so as to have a peak AGC sample at the pre-defined position therein.

* * * * *